United States Patent [19]

Connor

[11] 3,769,451

[45] Oct. 30, 1973

[54] VIDEO ENCODER UTILIZING COLUMNS OF SAMPLES ENCODED BY PREDICTION AND INTERPOLATION

[75] Inventor: Denis John Connor, New Shrewsbury, N.J.

[73] Assignee: Bell Telephone Laboratories, Incorporated, Murray Hill, N.J.

[22] Filed: Aug. 16, 1972

[21] Appl. No.: 280,964

[52] U.S. Cl. ................................ 178/6, 178/DIG. 3

[51] Int. Cl. ............................................ H04n 7/12

[58] Field of Search ............... 178/5, 6, 6.8, DIG. 3; 179/15 BW, 15.55 R; 325/38 R, 38 B

[56] References Cited

UNITED STATES PATENTS

| | | | |
|---|---|---|---|
| 2,905,756 | 9/1959 | Graham | 178/DIG. 3 |
| 2,921,124 | 1/1960 | Graham | 178/6 |
| 2,949,505 | 8/1960 | Kretzmer | 179/15.55 R |
| 3,736,373 | 5/1973 | Pease | 178/DIG. 3 |

*Primary Examiner*—Howard W. Britton
*Attorney*—W. L. Keefauver et al.

[57] ABSTRACT

Video signal samples from a video frame are divided into two sets of alternating interlaced columns one sample wide. Each sample from the first set is encoded differentially with a predicted value developed from reconstructed versions of priorly encoded samples from the first set. Each predicted value for a sample of the first set is of the weighted combination type. Each sample from the second set is encoded differentially with a predicted value developed from reconstructed versions of samples from the first set. Each prediction value for a sample of the second set is developed by means of interpolating adjacent reconstructed samples from the first set.

10 Claims, 3 Drawing Figures

VIDEO ENCODER UTILIZING COLUMNS OF SAMPLES ENCODED BY PREDICTION AND INTERPOLATION

BACKGROUND OF THE INVENTION

This invention relates to video signal processing, and more particularly to methods and apparatus for improving the utilization efficiency of available video transmission bandwidth.

Video frames typically possess substantial correlation between samples spatially proximate to one another. It has therefore been a long-standing goal in the design of video processing systems to utilize this high degree of correlation in order to improve transmission efficiency. These systems, collectively known as redundancy reduction systems, most often utilize a sample or set of samples as a predicted version of a sample being encoded. Thereupon, the difference between the sample and its associated predicted value is quantized and transmitted.

In the prior art, a large number of prediction schemes are shown which to a greater or lesser extent improve the efficiency of the video encoding and transmission process. These schemes include varieties of both one and two dimensional spatial prediction as well as frame-to-frame temporal prediction. Moreover, various classes of video encoders have utilized interpolative prediction whereby a sample is associated with a predicted value developed by interpolating nearby samples.

In accordance with the long standing objective of improving predictive encoding techniques, it is an object of the present invention to achieve further performance improvements over the prior art while maximizing the utilization efficiency of available transmission bandwidth.

SUMMARY OF THE INVENTION

The present invention is based upon the proposition that if certain selected samples within a field are encoded to a primary degree of accuracy, the remainder of the samples in the same field require less precision in order to achieve superior performance. Moreover, the present invention further allows for the feature that the type of encoding utilized for the different groups of samples being encoded with variable precision need not be the same as one another. In other words, the basic aspect of the present invention features the division of samples into groups with each group receiving quantization of different accuracy. A further refinement features separate types of encoding, the second being dependent on the first and being characterized by less precision or accuracy and therefore by less transmitted detail.

The present invention achieves the foregoing object by means of dual mode predictive techniques. Every frame of samples is treated as two separate sets of alternating interleaved columns of samples, each column being one sample wide. Hence, every sample is bounded above and below by samples from its own set, and on either side by samples from the other set. In accordance with the present invention, samples from the first set are encoded differentially with predicted versions thereof developed solely from reconstructions of other samples in its own set, while samples from the second set are encoded differentially with predicted versions developed only from reconstructions of encoded samples from the first set.

In an illustrative embodiment of the present invention, samples from the first and second set are subtracted from predicted values thereof, and the differences are quantized and transmitted. Preferentially, the predicted value for each sample in the first set comprises a weighted combination of decoded versions of samples from the same line and previous column of the same set, the same column and previous line, and the previous line and subsequent column of the same set. Once two successive samples from the first set are encoded, the quantized versions are decoded and the intermediate sample from the second set is subtracted from an interpolated value developed from the decoded adjacent samples from the other set. Whenever samples from the first set are quantized by four bits to 16 levels, and samples from the second set are quantized by three bits to eight levels, an efficient 3.5 bit per sample transmission rate is achieved.

It is a feature of the present invention that exceptional visual performance is achieved over prior art systems. Moreover, the dual mode prediction technique allows for this performance improvement at the expense only of an averaged 3.5 bits per sample.

DETAILED DESCRIPTION

Figure 1:
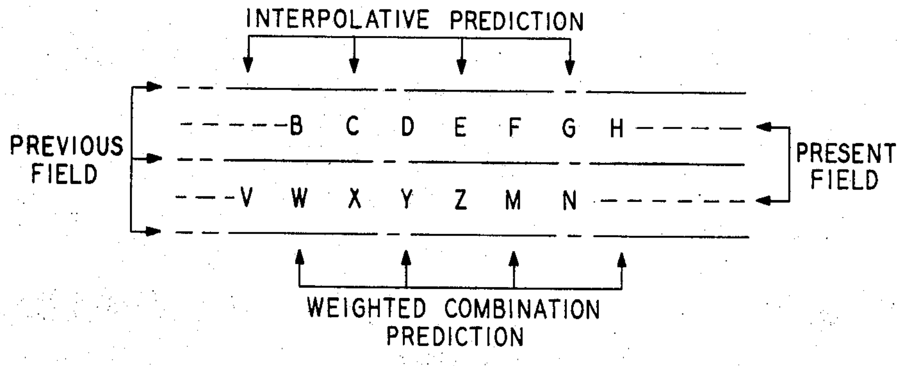
FIG. 1 shows an arrangement of picture elements divided into columns in accordance with the technique featured by the present invention.

The picture elements shown in FIG. 1 represent a portion of a video frame and are useful to illustrate the theory of the present invention. Each of the letters represents a different video signal sample along a line, with the standard field-to-field interleaving of lines. Thus, samples B through H represent a portion of one line in a frame, and samples V through Z represent samples from the very next line in the same field. The arrows above and below the samples in FIG. 1 demonstrate how the frame is divided into two separate sets. That is, as briefed hereinbefore, the present invention features the classification of each frame into two separate sets of alternating interlaced columns of samples, each column being one sample wide. Hence, in FIG. 1, samples V, C, X, E, Z, N, and G all belong to one set. Likewise, samples B, W, D, Y, F, M, and H all belong to the other set of samples. Hereinafter, the set of samples designated in FIG. 1 for weighted combination prediction, including samples B, W, D, etc., shall be referred to as a "first set," and the samples designated in FIG. 1 for interpolative prediction, such as samples V, C, X, etc., shall be called a "second set."

In accordance with the principles of the present invention, columns of samples in the first set are encoded differentially with predicted values assembled solely from other samples in the first set. Preferentially, the type of prediction utilized is that of a weighted combination of priorly encoded samples from the same set. Thus, in the preferred embodiment of FIG. 2, sample Y is encoded by means of a prediction assembled on the basis of samples W, D, and F:

$$Y_P = \hat{W} + 2\hat{D} + \hat{F}/4 \qquad (1)$$

where $Y_P$ represents a predicted value for sample Y, and $\hat{W}$, $\hat{D}$, and $\hat{F}$ each represent decoded versions of the previously encoded values of their respective samples. Thereupon, the difference $Y - Y_P$ is quantized and transmitted. That is, if a subscript Q is used to define quantization, $Y_D = (Y - Y_P)_Q$, where $Y_D$ is the transmitted differential.

Once two successive samples from the first set have been encoded, (e.g., samples W and Y), enough information is available for the encoding of the intermediate sample from the second set (e.g., sample X). In the preferred embodiment of FIG. 1, intermediate sample X, being a member of the second set, is encoded differentially with a predicted value based on interpolative prediction. More particularly, the interpolative prediction occurs only on the basis of samples from the first set of samples, and furthermore, solely on the basis of adjacent samples. Adhering to the notation established hereinbefore, the interpolation is expressed as:

$$X_P = \hat{W} + \hat{Y}/2, \text{ and } X_D = (X - X_P)_Q. \qquad (2)$$

In summary, FIG. 1 demonstrates that the techniques featured by the present invention call for the division of a frame into two sets of columns, each sample of the first set being encoded differentially with weighted combination of other samples of the first set, and each sample from the second set being encoded differentially with interpolated values from the first set.

Figure 2:
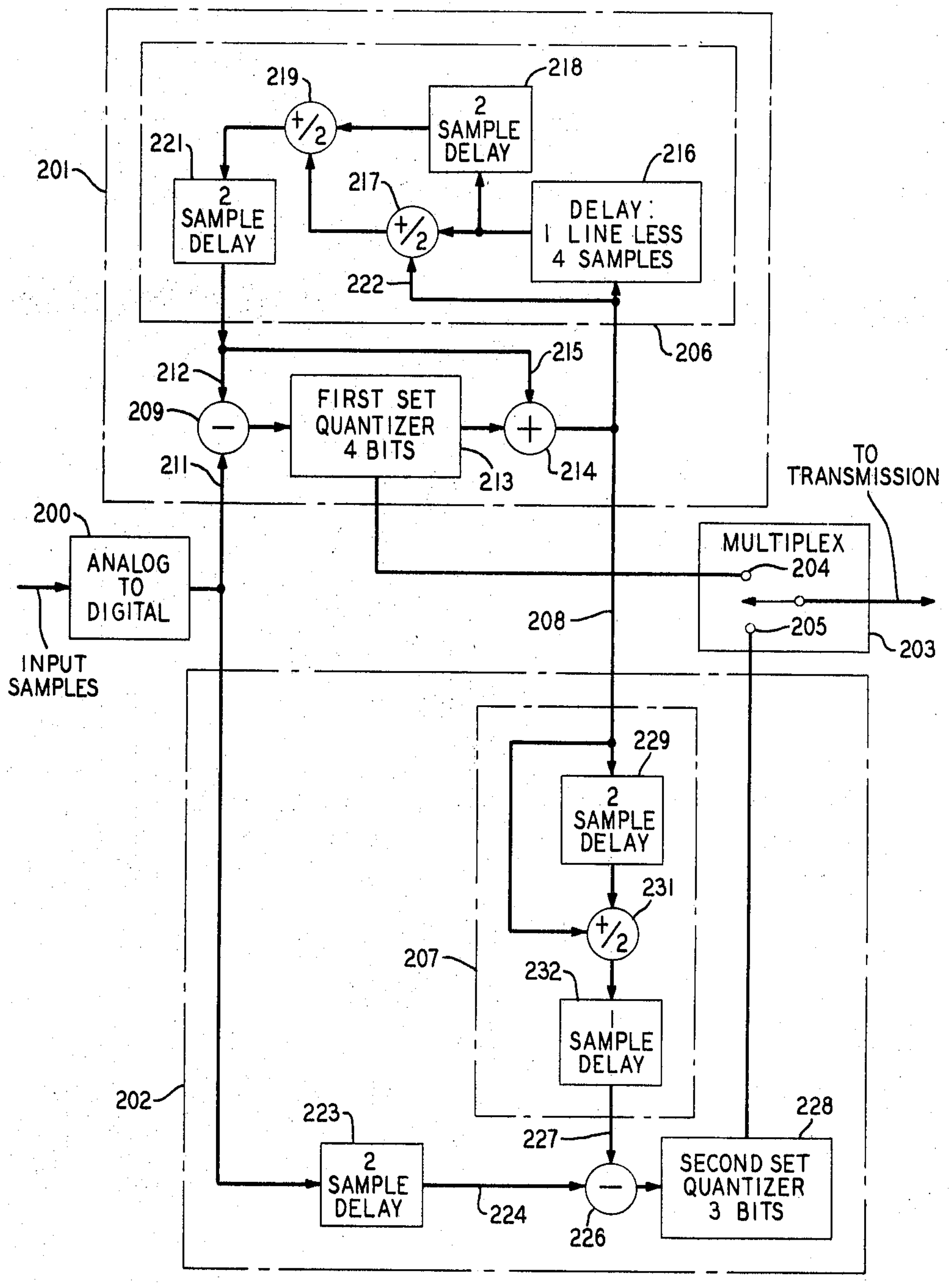
FIG. 2 is a schematic block diagram of an encoder which embodies the principles of the present invention.

FIG. 2 shows an encoder which embodies the principles of the present invention. Moreover, FIG. 2 is a preferred embodiment in the sense that it utilizes weighted combinations for predicted versions of samples from the first set and interpolation for predicted versions of samples from the second set. The functional blocks in FIG. 2 are basic and are quite well known, their embodiment being obvious to those skilled in the art. For example, delay elements are embodied simply as sequences of flip-flops arranged to suitable length. Hence, the following disclosure generally shall not dwell on particular circuit embodiments.

The clock timing of the FIG. 2 embodiment is not expressly shown, but those skilled in the art will recognize that all of the circuitry functions as standard sequential circuitry. Thus, if all of the FIG. 2 apparatus is connected to a clock which produces a timing pulse once for each video signal sample (since the time delays for the individual processes such as adding and subtracting are small enough to be ignored), the apparatus of FIG. 2 operates straightforwardly with respect to timing. Similarly, delay circuitry blocks are occasionally provided. Each of these functions on the basis of a single clock/smapling period being a unit of time. Thus, referring to the samples of FIG. 1, if sample M is presented at the input of a two-sample delay element such as block 223 of FIG. 2, sample Y is at that time present at its output. Hence, two sampling times later, sample M will be present at the output of the delay circuit.

Input samples are coupled to an analog-to-digital converted 200 which functions to process all samples into suitable digital form for the remainder of the apparatus. It is contemplated that an eight-bit, 256 level quantization is adequate for most video signals. Accordingly, except for the occasions in which it is specified otherwise, all apparatus shown in the drawings has the capacity of processing eight-bit digital words, and all lines in the drawings represent eight parallel lines, one for each bit. Of the 256 levels thereby rendered available, it is preferred that 128 be positive and 128 be negative.

Beyond the analog-to-digital converter 200, two separate encoders 201 and 202 are utilized for the encoding of the samples. The foregoing general description associated with FIG. 1 demonstrated that all picture samples are to be divided into two sets, with each set being encoded in a different manner. The two coders 201 and 202 of FIG. 2 respectively encode these first and second sets of samples. It is noteworthy, however, that the coders 201 and 202 each process all samples of a frame. Nevertheless, by means of an output multiplexer 203, the first coder 201 effectively encodes only the first set of samples from the standpoint of output, and the second encoder 202 effectively encodes only the samples from the second set.

The multiplexer 203 is represented symbolically as a switch which couples an output transmission channel either to terminal 204 or to terminal 205. Since terminal 204 is the output terminal from the first coder 201 and since the terminal 205 is the output terminal of the second coder 202, the switch of multiplexer 203 selects the encoded item which will be conveyed to a transmission medium as output. It is contemplated that the switch of multiplexer 203 be connected back and forth between terminals 204 and 205 during alternating sampling periods such that during a first sampling period, a coded differential is taken from terminal 204 (and thereby from coder 201), during the next sampling period, a coded differential is taken from terminal 205 (and thereby from the second coder 202), and so on between the respective terminals.

As the switch of multiplexer 203 thusly is connected between terminals 204 and 205, the type of encoding processes accorded corresponding input video signal samples is effectively alternated between the first coder 201 and the second coder 202. It is functionally noteworthy, however, that all samples are coupled to the inputs both of coders 201 and 202. The significance of this feature is that information produced in the first coder 201 is utilized to assemble predicted values of samples from the second set which subsequently are to be encoded by the second encoder 202. This feature, which will be discussed in more detail hereinafter, is enabled by a signal path 208 which connects the first coder 201 with the second coder 202.

Operationally, the respective coders 201 and 202 most conveniently are described separately, with the interaction to be detailed thereafter. As the eight-bit version of each input sample is developed by the analog-to-digital converter 200, it is coupled to a subtraction circuit 209 of the first coder 201. The type of encoding utilized by both coders 201 and 202 is differential (i.e., wherein actual sample values are subtracted from predicted versions thereof, with the differential being quantized and transmitted), so it is first necessary to compute the difference between the sample and its predicted value.

In the first coder 201, a logic network 206 serves the function of producing predicted values. Hence, since the actual sample value is presented at input 211 of subtractor 209 and since the predicted value is presented at input 212 of subtractor 209, the output of subtraction circuit 209 in fact represents a differential between sample and predicted value. Accordingly, the next processing step is quantization which is realized at the first set quantizer 213. It turns out that a four-bit, 16-level quantization is quite adequate to encode differentials of samples in the first set. That is, it has been determined that a weighted combination type of prediction such as the one embodied by the logic block 206 of coder 201 produces predicted versions sufficiently accurate that the resulting differentials may be accurately quantized by eight positive and eight negative levels, which of course are represented by words consisting of four binary bits. The four-bit binary output representation of these differentials is conveyed for transmission to terminal 204 of multiplexer switch 203.

In addition to being conveyed as an output quantity, the quantized differential produced by the first set quantizer 213 is conveyed in its original eight-bit form for internal use to an adder 214. Since the other input of the combinatorial circuit 214 comes from the prediction-producing logic block 206, the effect of the resulting addition is a decoded reconstruction of the input sample. For example, if the output of the quantizer is representative of a particular sample value, sample $Y$, less its predicted value, $Y_P$, the output of the first set quantizer 203 represents the differential $Y_D = Y - Y_P$. In such a situation, the quantity delivered at the second input 215 of adder 214 is also the predicted value $Y_P$ which was coupled via terminal 212 to subtraction circuit 209. Hence, the output of the adder 214 is $\hat{Y}$, a decoded reconstruction of the input sample Y.

In accordance with the principles of the present invention, the reconstructed sample represented at the output of adder 214 is utilized for the synthesis of predicted values both for samples of the first set and of the second set. Consequently, that output quantity ($\hat{Y}$ in the foregoing example) is coupled both to first logic circuit 206 of coder 201 and to a second logic circuit 207 of coder 202. It may be recalled that the logic blocks 206 and 207 respectively serve the functions of producing weighted combination and interpolated values for predicting samples of the first and second sets. It is therefore clear that utilization of the reconstruction output of adder 214 fulfills the feature of the present invention which provides that only samples from the first set be used to assemble predictions for samples of both the first and second sets of samples.

Once samples are reconstructed at adder 214, they are coupled to a predictive logic block 206, therein coupled both to a delay line 216 and to a combinatorial circuit 217. The delay line subjects input quantities to a delay of one video line less four individual samples. Thus, in the example of FIG. 1, when sample $W$ is presented at the input of delay line 216, sample $F$ is simultaneously presented at its output. The output quantity from the delay line 216 is coupled to the combinatorial circuit 217, and to a two sample delay line 218 as well. The combinatorial circuit 217 adds together the quantities presented at its inputs, and halves the resulting sum. Thus, when samples $W$ and $F$ of FIG. 1 are presented to the inputs of combinatorial circuit 217, its output is $W + F/2$. The delay element 218 merely subjects input quantities to a delay of two sampling periods, such that when sample Y is presented at its input, sample W is simultaneously represented at its output. The output of delay element 218 is coupled to combinatorial circuit 219, a second input of which is coupled to receive the output of combinatorial circuit 217. The summed and halved output of combinatorial circuit 219 is coupled to a two sample delay element 221, the output of which represents a weighted combination prediction of the sample which at that time is being presented at input 211 of subtraction circuit 209.

In order to facilitate understanding of the operation of prediction circuit block 206 it is appropriate to choose a particular example relative to the samples shown in FIG. 1. Since the principle function of coder 201 is to encode samples of the first set, the principle function of the prediction block 206 is to predict values of samples from the first set; thus, the following example will deal with sample Y of FIG. 1, which is a sample from the first set and therefore is to be encoded by means of weighted combination prediction. Whenever sample Y is presented at one input of subtractor 209, its reconstructed version $\hat{Y}$ is being produced at the output of adder 214, since its predicted version is represented at output terminals 212 and 215 of prediction circuit block 206. If $\hat{Y}$ is being coupled to the delay line 216 and to the first input 222 of combinatorial 217, the quantity presented to the other input of combinatorial circuit 217 from delay line 216 is the reconstruction $\hat{H}$. Therefore, the output of combinatorial circuit 217 is $\hat{Y} + \hat{H}/2$, which in turn is applied to one input terminal of combinatorial circuit 219. When $\hat{H}$ is the input to delay element 218, the output thereof is the reconstructed sample $\hat{F}$. The output of combinatorial circuit 219 is therefore $\hat{Y} + \hat{H} + 2\hat{F}/4$. By referring back to Equation 1, this quantity may be recognized as a predicted value for sample M, $M_p$, which in fact is the next sample of the first set to be encoded by coder 20 after it encodes sample Y. Finally, whenever the quantity $M_p$ is presented at the input of the two sample delay line 221, the output clearly corresponds to the predicted value $Y_p$. That is, substituting corresponding values into the foregoing expression for $M_p$ with a two sample delay yields the relation:

$$Y_P = \tfrac{1}{4}\,(\hat{W} + \hat{F} + 2\hat{D}). \quad (3)$$

Clearly, this is identical to the expression for $Y_P$ which is expressed in Equation 1. Moreover, due to the two sample delay provided by delay element 221, the appropriate predicted value for each sample in the first set is represented at input 212 of subtractor 209 during the same timing periods as the sample itself is coupled to input 211. Since these timing periods are designed to concur exactly to the periods when the multiplex switch 203 is connected to terminal 204, it is only during those times that the coder 201 is effective to produce a transmitted output code.

In summary, the first coder 201 differentially encodes input samples from the first set of samples. More particularly, on the basis only of reconstructed versions of other previously encoded samples of the first set, the logic circuit 206 assembles a weighted combination of samples which serves as a predicted value of the sample being encoded. Whenever samples from the first set are presented at input terminal 211, predicted values thereof are likewise presented at terminal 212 of subtractor 209, and simultaneously the multiplexing switch 203 is connected to terminal 204, thereby insuring transmission of the encoded differential.

During the sampling periods when samples from the second set are presented from the analog-to-digital converter 200, the second coder 202 is the one which has an effective operation. This efficacy results from the fact that during those sampling times when samples from the second set are to be encoded, the multiplexing switch 203 is connected to terminal 205. Thus, during such times, only the output of the second coder 202 is coupled to a transmission medium.

Each input sample delivered to the second coder 202 is first coupled to a two sample delay element 223. This element is necessary such that the input samples from the second set may be encoded differentially with an interpolated version thereof based on adjacent samples from the second set. In other words, due to the fact that two successive samples from the first set are the only ones to be used for the encoding of the sample from the second set located therebetween, the actual encoding of that sample from the second set must be delayed a time interval sufficient to encode the respective adjacent samples from the first set. Thus, for example, whenever sample X is delivered to the second coder 202, sample W of the first set has just been encoded by the first coder 201 (thereby establishing sufficient information to encode sample V). Since sample X is to be encoded by means of an interpolation between samples W and Y, it is necessary to delay the encoding of sample X until sample Y is also encoded by the first coder 201. Thus, the two sample delay afforded by delay element 223 allows first for the encoding of the preceding sample from the second set to be encoded (i.e., sample V) and secondly for the actual encoding of sample Y. Thus, two sampling periods after a sample of the second set such as sample X is coupled to the second coder 202, sufficient information about adjacent samples from the first set is available, and encoding of the sample from the second set may be conducted. Hence, after the two sampling period delay afforded by the delay element 223, samples are applied to a first input 224 of a subtraction circuit 226 for encoding. Subtraction circuit 226 operates to compute the differential destined to be transmitted as an output. Thus, at the second input 227 of subtraction circuit 226, a predicted value based on interpolation is received from logic circuit 207. Thereafter, the differential is quantized to a three-bit seven-level accuracy by the second set quantizer 228. As is evident from the drawing, during such times the multiplexing switch 203 is connected with a terminal 205, which corresponds to the occurrence to samples in the second set, and the output of the second set quantizer 228 is thereby coupled to the transmission medium.

The predictive circuit block 207 of the second coder 202 operates as follows. By means of a line 208, a reconstruction of the most recently encoded sample from the first set is made available. This reconstruction is coupled both to a two sample delay element 229 and to a combinatorial circuit 231. The delay element 229 is identical to those described hereinbefore, such as elements 218 and 221, and the combinatorial circuit 231 is similar to those in the first coder 210 which add input quantities together and divide the sum by two. Thus, when sample $\hat{Y}$ is delivered from line 208, the output of of the combinatorial circuit 231 is $\hat{Y} + \hat{W}/2$. Thereupon, the combined value is coupled to a one sample delay element 232. When $\hat{Y} + \hat{W}/2$ is delivered at the input of the one sample delay element 232, the quantity $\hat{X} + \hat{V}/2$ is delivered via line 227 to the subtraction element 226.

From the example just described, it is clear how the various delays of the predictive circuit 207 operate cooperatively with the two sample delay element 223 and the output multiplexing switch 203 to achieve effective transmission only of samples from the second set. That is, it should be noted that, when sample $\hat{Y}$ is delivered to line 208, sample Y from the first set is at that time being encoded and the multiplexing switch 203 is connected to terminal 204. Thus, although the output of the two sample delay element 223 is sample W, which is a member of the first set of samples, and the other input to subtraction circuit 226 is the interpolated value of samples on either side of sample W, transmitted output from the second coder is prevented by multiplexing switch 203. In this manner, whenever a sample from the first set is being applied to input terminal 224 of subtraction circuit 226, no output is transmitted from the second coder 202. On the other hand, during alternate timing periods, a sample from the second set, such as sample X, is delivered to input terminal 224 of subtraction element 226. At precisely that time, the quantity which is presented at the other input terminal 227 of the subtraction circuit 226 is $\hat{Y} + \hat{W}/2$. Clearly, the quantity $\hat{Y} + \hat{W}/2$ represents an interpolated value of both samples which are adjacent to sample X. Moreover, this timing sequence represents the embodiment of an important aspect of the present invention, since samples from the second set are being encoded differentially with a predicted value made up solely of an interpolation of adjacent picture elements from the first set. During the time period when differentials of samples from the second set are being so computed and quantized by the second set quantizer 228, the output multiplexing switch is connected to terminal 205, thereby enabling transmission of the three-bit output word.

At this point, a brief word about output digit format is appropriate. Whereas the first set quantizer 213 utilized four bits to quantize input samples to a sixteen level granularity, eight levels being positive and eight being negative, the second set quantizer utilizes only three bits to encode input differentials and, moreover, only to a seven level granularity, with one level being located at zero, three being positive, and three being negative. The reason for this disparity is that once samples from the first set are quantized to the degree of accuracy called for, it is very likely that the interpolated value of two successive samples from the first set will accurately represent the intermediate sample of the second set. Thus, not only are fewer quantizing levels necessary for the encoding of samples from the second set, but it is also very likely that there will be no perceptible disparity at all between a sample of the second set and its interpolated predicted value. Thus, the second set quantizer 228 provides a zero level which indicates that the interpolated predicted value is, for all practical purposes, of the same magnitude as the input sample of the second set.

In summary, the embodiment of FIG. 2, by means of an output multiplexing switch 203, isolates the encoding of samples from the first and second sets, respectively, to coders 201 and 202. The first coder 201 features weighted combination-type prediction, with the combination made up only of other samples previously encoded from the first set. The first coder 201 utilizes four-bit differential quantization. The second coder 202 utilizes interpolative prediction, the interpolation being based only upon adjacent samples from the first set. The second coder 202 also uses differential quantization, but utilizes three rather than four output bits. Thus, on the average, a 3.5 bit per sample rate results. Due to the various delays provided in both coders 201 and 202, the order of digits presented for output is as follows: a first sample from the first set, the immediately previous sample of the second set, a second succeeding sample of the first set, the sample of the second set intermediate, the first and second samples from the first samples from the first set, and so on. For the samples shown in FIG. 1, the order of output differentials would be those for samples W, V, Y, X, M, Z, and so on. This output format becomes significant in terms of the delays which must be provided by the decoder.

Figure 3:
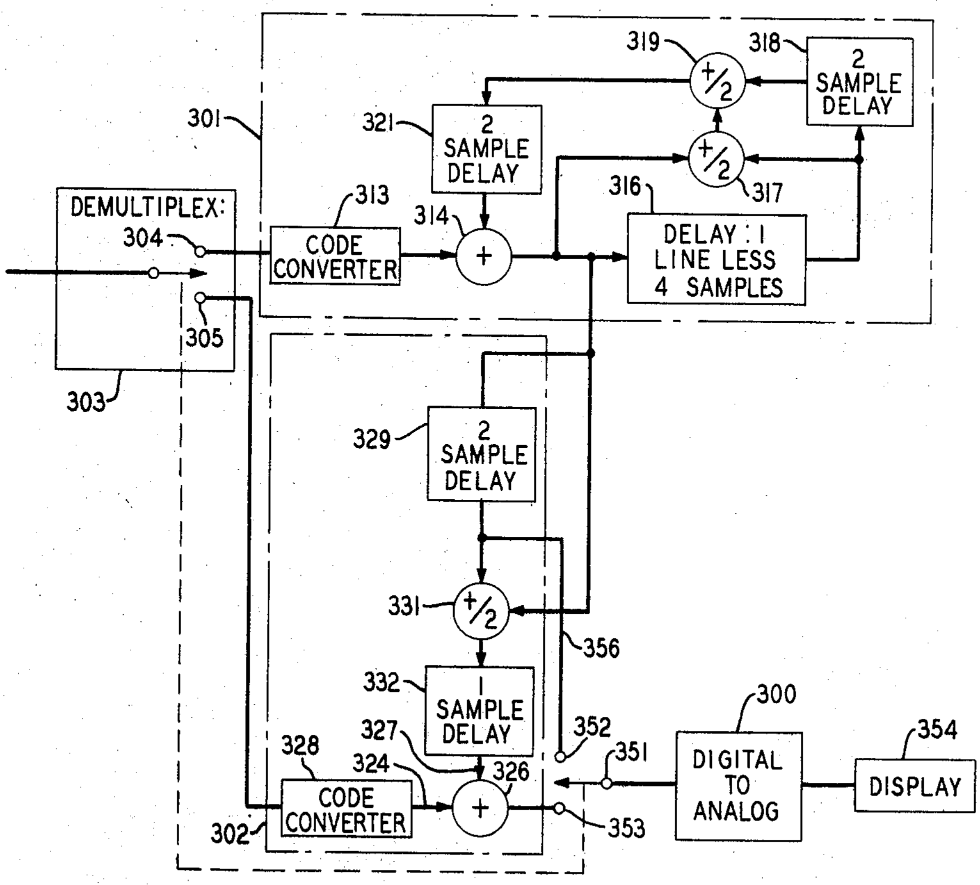
FIG. 3 is a schematic block diagram of a decoder which embodies the principles of the present invention.

A decoder which embodies the principles of the present invention and which is designed to operate in synchronous harmony with the encoder of FIG. 2 is disclosed in block diagramatic form in FIG. 3. As nearly as possible, all blocks which have functional analogs in the encoder of FIG. 2 are represented in FIG. 3 with similar numbers. Thus, the decoder of FIG. 3 includes a pair of separate decoding processors 301 and 302 which are inversely analagous in function to the coders 201 and 202 of FIG. 2. Likewise, the processors 301 and 302 operate cooperatively with a demultiplexing switch 303 which functions inversely to the multiplexing switch 203 of FIG. 2. Hence, the processors 301 and 302 separately operate only upon samples of the first and second sets, respectively.

The timing aspects of the FIG. 3 decoder need not be discussed in great detail herein, since given the format of signals from the encoder of FIG. 2, adequate timing arrangements for the decoder of FIG. 3 are quite obvious to those skilled in the art. That is, the precise order in which encoded samples are received is known, as is the fact that samples from the first set are encoded by means of four-bit differentials whereas samples from the second set are encoded as three-bit differentials. It is anticipated that horizontal and vertical blanking information may be inserted in quite a standard manner. Thus, the rather complex but equally obvious timing and sync information extraction functions are not expressly provided for in FIG. 3. Consequently, the demultiplexer 303 of FIG. 3 is represented symbolically by means of a switch which alternates its position between terminals 304 and 305. It is anticipated that the demultiplexer switch 303 by closed to terminal 304 upon the occurrence of an input differential from the first set of samples, and closed to terminal 305 upon the occurrence of differentials from the second set of samples. The demultiplexer switch 303 also controls in a synchronous manner the operation of an output switch 351. Hence, when demultiplexer switch 303 is closed to terminal 304 and thereby to the first decoding processor 301, the output switch 351 is closed to terminal 352. Similarly, when the demultiplexer switch 303 is closed to terminal 305 and thereby couples input samples to the second decoding processor 302, the output switch 351 is coupled to terminal 353. The input demultiplexer switch 303 determines which of the decoding processors 301 or 302 does the decoding of a given sample, and the output switch 351 couples the appropriate decoded differential first to a digital-to-analog converter 300 which in turn reconstructs the analog video signal and applies it to a display apparatus 354.

It may be recalled that all of the internal processing of the FIG. 2 encoder was done utilizing eight-bit, 256-level digital words. In order to utilize samples of the same accuracy in the decoder of FIG. 3, both decoding processors 301 and 302 first utilize code converters 313 and 328 which convert the transmitted differentials into eight-bit form suitable for further processing. Thus, a first set converter 313 converts the four-bit coded differentials of samples from the first set back into eight-bit digital words. Similarly, a second set converter 328 converts the three-bit coded differentials of samples from the second set back into eight-bit binary words. Thereupon, the remainder of the apparatus serves the function of actual reconstruction of the samples from the differentials which have been transmitted.

The first decoding processor 301, which serves to decode samples from the first set, is very similar in structure and function to the first coder of FIG. 2. In fact, except for the first set code converter 313, the remainder of the processor 301 is lifted intact from the first coder 201 of FIG. 2. Parenthetically, it may be noted that the operation of that "lifted" apparatus is unchanged in FIG. 3. It may be recalled that the first coder functions to produce quantized differentials which at adder 214 are combined back with a predicted value of corresponding sample, the combination being a reconstruction of the corresponding sample which is to be used for subsequent prediction in both coders 201 and 202. Since the differential encoding of subsequent samples depends exclusively on these reconstructions, it is clear that the decoders 301 and 302 need simply assemble and utilize only those reconstructed sample values. If this is done, the display 354 will be operating in synchronous harmony with the encoder of FIG. 1, and the only error will be the quantizing error which is introduced by the quantizers 213 and 228.

Eight-bit versions of first set differentials are therefore delivered to one input of an addition circuit 314 which is fed at its other input from a feedback path which supplies predicted values of the corresponding sample. Inspection of that feedback path reveals a trio of delay elements 316, 318 and 321 as well as a pair of combinatorial circuits 317 and 319, the aggregate of which are identical to the elements of similar number in the first prediction circuit 206 of FIG. 2. It is therefore clear that the adder 314 produces reconstructions of first set samples which may be utilized to assemble further predicted values for processors 301 and 302. Moreover, these reconstructions serve intact as decoded first set samples for display. Accordingly, the output of the adder 314 is coupled to the predictive circuitry of both decoding processors 301 and 302.

The second processor 302 functions inversely to the first coder 202, and thereby produces reconstructions of samples from the second set based on dequantized differentials added to interpolations based on first set reconstructions from adder 314. This addition occurs at an addition circuit 326, the interpolated prediction being produced by circuitry which includes two delay elements 329 and 332 and a combinatorial circuit 331.

Clearly, the aggregated interpolation circuitry including elements 329, 331 and 332 is identical to the second predictive circuit 207 of FIG. 1. The functioning thereof is likewise identical. Thus, once the interpolated predicted value is assembled in a manner identical to that accomplished by the second predictive circuit 207 of FIG. 2, that interpolated value is coupled via line 327 to the adder 326. Therefore, the output of the adder 326 represents a reconstruction of samples from the second set and is presented to output terminal 353. In addition, first set reconstructions are coupled to terminal 352 of output switch 351 by means of an output line 356.

The decoder of FIG. 3 operates as follows. Encoded differentials are separated into the first and second sets by the demultiplexing switch 303, with those from the first set being coupled to the first decoding processor 301 and those of the second set being coupled to the second decoding processor 302. It may be recalled that the samples from FIG. 2 are received in slightly inverse order, with a sample from the first set being received priorly in time to the sample from the second set which immediately precedes it in the video frame. Hence, passing first set reconstructions through the two sample delay element 329 also allows for rearrangement of the samples into a proper sequence. As each differential from the first set of samples is coupled to terminal 304, it is converted to eight bits and applied to adder 314. During the same sampling period, the adder 314 recombines it with its predicted value, thereby producing the desired reconstruction of the first set sample, and couples it to a two sample delay element 329. During the next timing period, the demultiplexing switch 303 is connected to terminal 305, and the output switch 351 is connected to terminal 353. Thereupon, the differential from the second set which occurs during that timing period is converted by code converter 328 and applied to the adder 326, where the reconstruction is completed and the second set sample is coupled to the display 354. While the second set processing is being conducted, the lastmentioned sample from the first set is being stored in the two sampling period delay element 329. During the next timing period, when the demultiplexing switch is connected back to terminal 304 and another sample from the first set is being received, the previous sample from the first set appears at the output of the two sample delay element 329 and thereby is coupled via line 356 to output terminal 352. Since switch 351 is connected to terminal 352 whenever switch 303 is connected to terminal 304, this results in the coupling of the first-mentioned sample of the first set from the two sample delay element 329 to the digital-to-analog converter 300. Hence, the decoder of FIG. 3 rearranges the order of samples such that the display 354 displays them just as they originally occurred.

This rearrangement concept can perhaps be better understood by means of an example. It has been shown hereinbefore that for the second line of samples in FIG. 1, the output of the FIG. 2 encoder would be differentials in the sequence W, V, Y, X, M, Z, and so on. When the sample W differential is received by demultiplexer 303, it is coupled to the first processor 301, the reconstruction is accomplished, and the sample W reconstruction is applied to the two sample delay element 329. During the next timing interval, when switch 303 is connected to terminal 305, a differential representing the encoded sample V is received and is coupled to the second processor 302. At that time, sample V is reconstructed by the adder 326 and is conveyed to the display 354. During the time that sample V is thusly being processed, sample W is being held in the delay element 329. During the next timing period, when sample Y is received, switch 303 is connected to terminal 304 and switch 351 is connected back to terminal 352. Hence, while sample Y is being reconstructed by the first processor 301, the reconstruction of sample W is being conveyed from the delay element 329 via switch 351 to the display 354. At that time, sample Y is being coupled to the input of delay element 329. During the next timimg period, sample X is received, is immediately conveyed to the second processor 302 and thereupon is applied to the display. In this manner, the display 354 receives the samples in the order in which they originally occurred, i.e., V, W, X, Y, Z, M, N, and so on.

In summary, the decoder of FIG. 3 utilizes two separate decoding processors 301 and 302 to reconstruct samples which were encoded differentially by the encoder of FIG. 1. More particularly, the first processing decoder 301 utilizes weighted combination techniques to reconstruct samples of the first set, with the reconstruction being used as output and to generate further predicted values for reconstructing samples of both sets. The second processing decoder 302 utilizes interpolative techniques to reconstruct samples from the second set of samples. Due to the synchronous operation of output switch 351 with demultiplexing switch 303, samples of the first and second set are withdrawn as output quantities in a proper order such that the display 354 produces a picture with elements in their proper spatial and temporal sequence.

The foregoing coder and decoder descriptions have been intended simply to be illustrative of the principles of the present invention. It is clear that several other embodiments may occur readily to workers skilled in the art without departing from the spirit or scope of the present invention. For example, while the encoder of FIG. 2 utilizes an output type of switching embodied by multiplexing switch 203 to isolate samples from the first and second set to their respective coders 201 and 202, thereby restricting the effective operation of those coders strictly to the corresponding class of signals, the same effect quite clearly could be achieved by utilizing input switching circuitry which shunts samples from either class only to the coder 201 or 202 which is destined to produce the proper transmitted differential. Similarly, while the weighted combination utilized for predicting samples of the first set appears to be a preferable alternative, many other weighting schemes utilizing reconstructed samples from the first set may be devised which tend better to satisfy individual requirements (e.g., of structural simplicity or of functional precision). In fact, many such weighting schemes are shown in the prior art, any of which could be used in the first coder 201 and the first decoding processor 301. Any such alteration, however, would be quite within the contemplation of the principles of the present invention.

What is claimed is:

1. Apparatus for encoding video signal samples divided into two sets of alternate interlaced columns of samples, each column being one sample wide, comprising:

a first differential coder including means for developing predicted sample values on the basis of reconstructed versions of selected priorly encoded samples of a first one of said two sets;

a second differential coder including means for developing predicted sample values by interpolating reconstructed versions of successive samples from said first set; and output means for selecting differentials for transmission alternately between said first and second coders, encoded differentials for samples of said first set being selected only from said first coder and encoded differentials for samples of the second one of said two sets being selected only from said second coder.

2. Apparatus as described in claim 1 wherein said means for developing predicted sample values in said first coder includes:

means for storing a plurality of reconstructed versions of priorly encoded samples of said first set; and means for developing a weighted combination of selected ones of said plurality of reconstructed versions, said weighted combination representing a predicted sample value.

3. Apparatus as described in claim 2 wherein said means for developing a weighted combination includes means for combining the reconstructed versions of the sample from the first set in the same line and previous column of the same set as the sample being predicted, the sample from the same column and prior line as the sample being predicted, and the sample from the prior line and subsequent column of the same set as the sample being predicted.

4. A method of encoding video signals divided into frames, each frame being subdivided into sets of alternate interlaced columns of picture elements, each column being one picture element wide, said method comprising the steps of:

developing a predicted value for each picture element in a first one of two sets from quantized versions of priorly encoded picture elements in said first set;

encoding each picture element in said first set differentially with its corresponding predicted value;

developing a predicted value for each sample in the second one of said two sets by interpolating between quantized versions of adjacent samples from said first set; and encoding each sample in said second set differentially with its corresponding predicted value.

5. The method described in claim 4 wherein the step of developing a predicted value for each element in a first set includes assembling a weighted combination of a plurality of priorly quantized picture elements from said first set.

6. Apparatus for encoding video signal samples comprising:

means for storing a first video signal sample;

first means for quantizing a difference between a second video signal sample and a developed predicted value for said second video signal sample;

means responsive to said difference and said predicted value for generating at its output a quantized version of said second video signal sample;

means responsive to the output of said generating means for developing said predicted value of the second video signal sample;

means responsive to said quantized version for developing an interpolated value for said first video signal sample;

second means for quantizing a difference between said first video signal sample and said interpolated value; and means for alternately selecting the quantized differences at the outputs of said first and second quantizing means.

7. Apparatus as described in claim 6 wherein said means for developing a quantized version of said second sample includes means for combining the predicted value of said second sample with a corresponding quantized difference from said first means for quantizing.

8. Apparatus as described in claim 6 wherein said means for developing an interpolated value includes means for storing quantized versions from said means for generating of the samples adjacent to said first sample, and means for interpolating the two quantized versions from said means for storing quantized versions by adding their magnitudes and halving the sum.

9. Apparatus as described in claim 6 wherein said means for developing a predicted value of the second video sample includes means for storing a plurality of quantized versions from said means for generating, and means for developing a weighted combination of selected ones of the quantized versions from said means for storing.

10. Apparatus as described in claim 9 wherein said means for developing a weighted combination includes first means for selecting a sample occurring two sample periods prior to said second sample in the same line as said second sample, second means for selecting the sample immediately above said second sample and in the same field as said second sample, and third means for selecting the sample two sampling periods subsequent to the sample selected by said second means for selecting.

* * * * *